(12) United States Patent
Nakamizo et al.

(10) Patent No.: US 6,579,648 B2
(45) Date of Patent: Jun. 17, 2003

(54) NONAQUEOUS SECONDARY BATTERY

(75) Inventors: Shiori Nakamizo, Amagasaki (JP); Hiroshi Watanabe, Sumoto (JP); Satoshi Narukawa, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 132 days.

(21) Appl. No.: 09/735,634

(22) Filed: Dec. 14, 2000

(65) Prior Publication Data

US 2001/0004502 A1 Jun. 21, 2001

(30) Foreign Application Priority Data

Dec. 15, 1999 (JP) ............................................. 11-355853

(51) Int. Cl.[7] .............................. H01M 2/16; H01M 2/18
(52) U.S. Cl. ........................ 429/249; 429/250; 429/142
(58) Field of Search ........................... 429/94, 249, 250, 429/142, 144

(56) References Cited

U.S. PATENT DOCUMENTS

| | | | | |
|---|---|---|---|---|
| 5,681,357 A | * | 10/1997 | Eschbach et al. | 29/623.4 |
| 6,180,281 B1 | * | 1/2001 | Schneider et al. | 429/129 |
| 6,232,014 B1 | * | 5/2001 | Shiota et al. | 429/137 |

FOREIGN PATENT DOCUMENTS

| | | |
|---|---|---|
| JP | 4-171660 | 6/1992 |
| JP | 8-507407 | 8/1996 |
| JP | 10-64503 | 3/1998 |
| JP | 10-189054 | 7/1998 |
| JP | 11-16561 | 1/1999 |
| WO | 94/20996 | 9/1994 |

OTHER PUBLICATIONS

Chemical Abstracts Registry No. 9011–17–0 no date.*

* cited by examiner

*Primary Examiner*—Carol Chaney
(74) *Attorney, Agent, or Firm*—Nixon & Vanderhye P.C.

(57) ABSTRACT

The nonaqueous secondary battery according to the invention uses a separator 10 which is a composite resin film with a reinforcing material layer 11 integrally filled with polyvinylidene fluoride resin 12 or a separator 20 which is a composite resin film with a polyvinylidene fluoride resin layer 21 and a reinforcing material layer 22 stacked thereon. In this way, when the reinforcing material layer 11 is integrally filled with the polyvinylidene fluoride (PVdF) resin 12, or the reinforcing material layer 22 is stacked on the polyvinylidene fluoride (PVdF) resin layer 21, even if the polyvinylidene fluoride resin swells, its swelling is limited by the reinforcing material layer 11, 21 in the directions of width and length so that the separator 10 or 20 does not wrinkle.

11 Claims, 5 Drawing Sheets

NONAQUEOUS SECONDARY BATTERY

BACKGROUND OF THE INVENTION

1. Field of the Invention

The present invention relates to a nonaqueous secondary battery comprising a negative electrode capable of intercalating/deintercalating lithium ions, a positive electrode having a lithium-containing metal oxide as a positive electrode active material, a nonaqueous electrolyte, and a separator for separating the positive electrode and negative electrode from each other.

2. Description of the Related Art

In recent years, with remarkable development of reduction of size and weight of an electronic appliance, a battery which is a power source therefor is very greatly demanded to implement reduction of size and weight. In order to satisfy such a demand, a nonaqueous secondary battery which is small in size and light in weight, has a large capacity and is capable of charging/discharging (which is represented by a lithium battery) has been put into practice. This nonaqueous secondary battery has been used in portable electronic/communication appliances such as a small-sized video camera, portable telephone, notebook-size personal computer, etc.

This kind of nonaqueous secondary battery uses a negative electrode active material of a carbon material capable of intercalating/deintercalating lithium ions, a positive electrode active material of a lithium-containing transitional metal oxide such as $LiMn_2O_4$, $LiNiO_2$, $LiMnO_4$, $LiFeO_2$, etc., and an electrolyte with lithium salt dissolved as solute in an organic solvent. In the nonaqueous secondary battery, after having been assembled as a battery, lithium ions derived from the positive electrode active material by initial charging enter carbon particles, thereby permitting charging/discharging to be realized.

Meanwhile, in the nonaqueous secondary battery, in which the nonaqueous electrolyte is used, a separator for separating the positive electrode and negative electrode from each other has been adopted which is a microporous film of a polyolefin resin such as a polyethylene (PE) or polypropylene (PP) which exhibits low reaction with the organic solvent and is inexpensive.

However, the microporous film made of polyethylene or polypropylene only keeps the electrolyte in its vacant holes. Therefore, it was problematic in that it exhibits low reltainability of electrolyte. In addition, the low electrolyte-retaining nature increases a internal resistance. This presented a problem of deteriorating overcharge characteristic as well as the cycle characteristic.

In order to solve these problems, for the purpose of improving the electrolyte-retaining nature, the non-woven fabric of polypropylene (PP) or polyethylene terephthalate (PET) was adopted as the separator. However, the non-woven fabric of PP or PET presented a problem of deteriorating the cycle characteristic like the microporous film.

This time, it was proposed to adopt the polyvinylidene fluoride resin film having good electrolyte-retaining nature. Since the polyvinylidene fluoride resin film provides good electrolyte-retaining nature and can be kept in intimate contact with the electrode, the internal resistance in the battery is reduced and the battery characteristic can be improved.

Although the polyvinylidene fluoride resin film provides good electrolyte-retaining nature, it presented a problem of a great change in the size due to swelling. Specifically, as shown in FIG. 5, when a separator 60 of the polyvinylidene fluoride resin film retains the electrolyte, it swells in all the directions of width (x-direction in FIG. 5), length (y-direction in FIG. 5) and height (z-direction in FIG. 5).

Meanwhile, as shown in FIG. 6, such a nonaqueous secondary battery described above is manufactured in such a way that a laminate composed of a positive electrode 70 (which is formed by applying a positive electrode active material layer 72 on both surfaces of a core body 71), a negative electrode 71 (which is formed by applying a negative electrode active material layer 82 on both surfaces of a core body 81) and a separator 60 located therebetween is wound spirally to provide a group of electrodes which are housed in a battery case. When the separator 60 swells, it wrinkles so that gaps 61 and 62 are produced between the separator 60 and the positive electrode 70 or the negative electrode 80. This led to a problem of an increase in the internal resistance. When the separator 60 wrinkles so that gaps 61 and 62 are produced between the separator 60 and the positive electrode 70 or the negative electrode 80, a dendrite is likely to occur because of non-uniformity in the reactions in the gaps 61 and 62. The occurrence of the dendrite led to a problem of internal short-circuiting.

SUMMARY OF THE INVENTION

The present invention has been accomplished in order to solve the above problems, and intends to provide a nonaqueous secondary battery which can prevent a separator from wrinkling even when a polyvinylidene fluoride resin film with excellent electrolyte-retaining nature is used as a separator material and decrease an internal resistance to give improved cycle characteristic and excessive charging characteristic In order to attain the above object, the nonaqueous secondary battery according to the invention uses a separator which comprises a polyvinylidene fluoride resin layer and a reinforcing material layer. Preferably the separator is a composite resin film with a polyvinylidene fluoride resin layer and a reinforcing material layer stacked thereon, or another composite resin film with a reinforcing material layer integrally filled with polyvinylidene fluoride resin. The composite resin film with a polyvinylidene fluoride resin layer and a reinforcing material layer stacked thereon can be a multi-layered composite resin film with a polyvinylidene fluoride resin layer and a reinforcing material layer stacked thereon, repeatedly. In this way, when the reinforcing material layer is stacked on the polyvinylidene fluoride (PVdF) resin layer is stacked, or the reinforcing material layer 11 is integrally filled with the polyvinylidene fluoride resin, even if the polyvinylidene fluoride resin swells because of retaining the electrolyte, its swelling is limited by the reinforcing material layer in the directions of width and length so that the separator does not wrinkle, thereby decreasing the internal resistance. Thus, a nonaqueous secondary battery with excellent cycle characteristic and excessive charging characteristic can be obtained.

In this case, the reinforcing material layer must be selected from the materials which do not swell even when they retain the electrolyte. Non-woven fabric of polyethylene terephthalate (PET), non-woven fabric of polypropylene (PP), non-woven fabric of polyethylene, microporous film of polyethylene, miciroporous film of polypropylene, etc. can be preferably used since they do not swell when they retain the electrolyte.

If the thickness of the reinforcing material layer is increased, the mechanical strength of the separator is also increased so that even if the polyvinylidene fluoride (PVdF) resin layer swells, the separator does not wrinkle. However, since the internal space of the battery is limited, if the thickness of the reinforcing material layer is increased, the thickness of the polyvinylidene fluoride (PVdF) resin layer must be decreased correspondingly. This leads to attenuation of its electrolyte-retaining nature. For this reason, it is preferred that the thickness of the reinforcing material layer is set at 30 μm or less, more preferably so thin that even when the polyvinylidene fluoride (PVdF) resin film 21 swells, the separator 20 does not wrinkle.

Said polyvinylidene fluoride resin is preferably a vinylidene copolymer of vinylidene fluoride homopolymer or vinylidene fluoride and at least one selected from the group consisting of ethylene trifluoride chloride, ethylene tetrafluride, propylene hexafluoride and ethylene.

According to using a composite resin film with a polyvinylidene fluoride resin layer and a reinforcing material layer stacked thereon as a separator, composition in a surface direction is made more uniform.

According to using a composite resin film with a reinforcing material layer integrally filled with polyvinylidene fluoride resin as a separator, composition in a three dimension direction being uniform can be obtained.

According to using a multi-layered composite resin film with a polyvinylidene fluoride resin layer and a reinforcing material layer stacked thereon repeatedly as a separator, high efficiency per thickness can be obtained.

BRIEF DESCRIPTION OF THE DRAWINGS

FIG. 1 is a schematic perspective view showing a separator according to the invention. FIG. 1(*a*) is a perspective view showing a composite resin film with a reinforcing material layer integrally filled with polyvinylidene fluoride resin. FIG. 1(*b*) is a perspective view showing a composite resin film of a laminate of a polyvinylidene fluoride resin and a reinforcing material layer.

FIG. 2 is a sectional view of a structure of a laminate of a positive electrode plate and a negative electrode plate with the separator shown in FIG. 1 intervening therebetween. FIG. 2(*a*) is a sectional view of the laminate using the separator shown in FIG. 1(*a*). FIG. 2(*b*) is a sectional view of the laminate using the separator shown in FIG. 1(*b*).

FIG. 3 is a schematic view of a nonaqueous secondary battery formed by inserting a plate-like body, which is formed by crushing a spiral electrode body flatly, into a case body and sealing it thermally.

FIG. 4 is a view showing a cyclic characteristic.

FIG. 5 is a schematic perspective view of a separator according to a prior art (comparative example).

FIG. 6 is a sectional view showing a state where a positive electrode plate and a negative electrode plate are stacked with the separator shown in FIG. 5 intervening therebetween.

10 . . . separator (composite resin film), 11 . . . reinforcing material layer, 12 . . . polyvinylidene fluoride resin, 20 . . . separator (composite resin film), 21 . . . polyvinylidene fluoride resin layer, 22 . . . reinforcing material layer, 30 . . . positive electrode plate, 31 . . . positive electrode core body, 32 . . . positive electrode active material (positive active material paste), 40 . . . negative electrode plate, 41 . . . negative core body, 42 . . . negative electrode active material layer (negative active material paste).

DESCRIPTION OF THE PREFERRED EMBODIMENTS

Figure 1A:
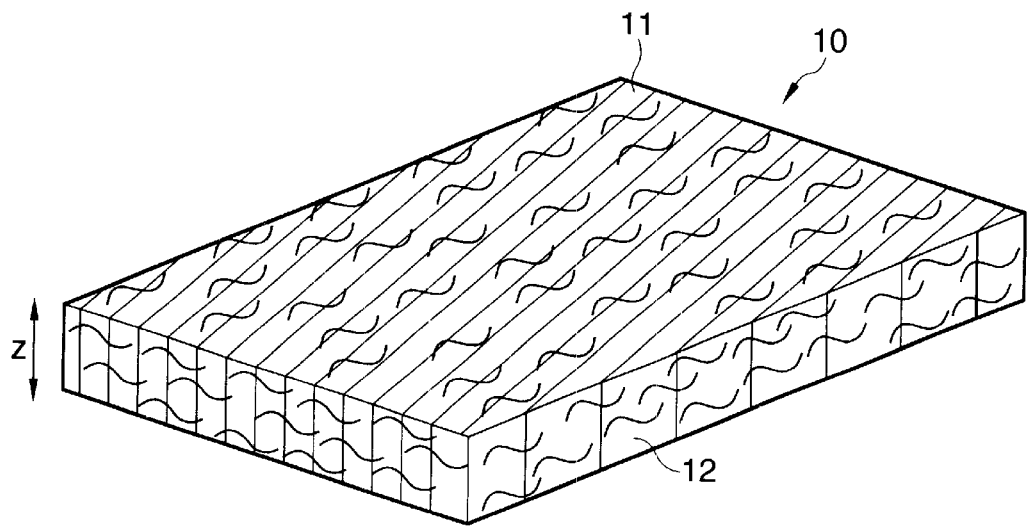
[FIG. 1]
Figure 1B:
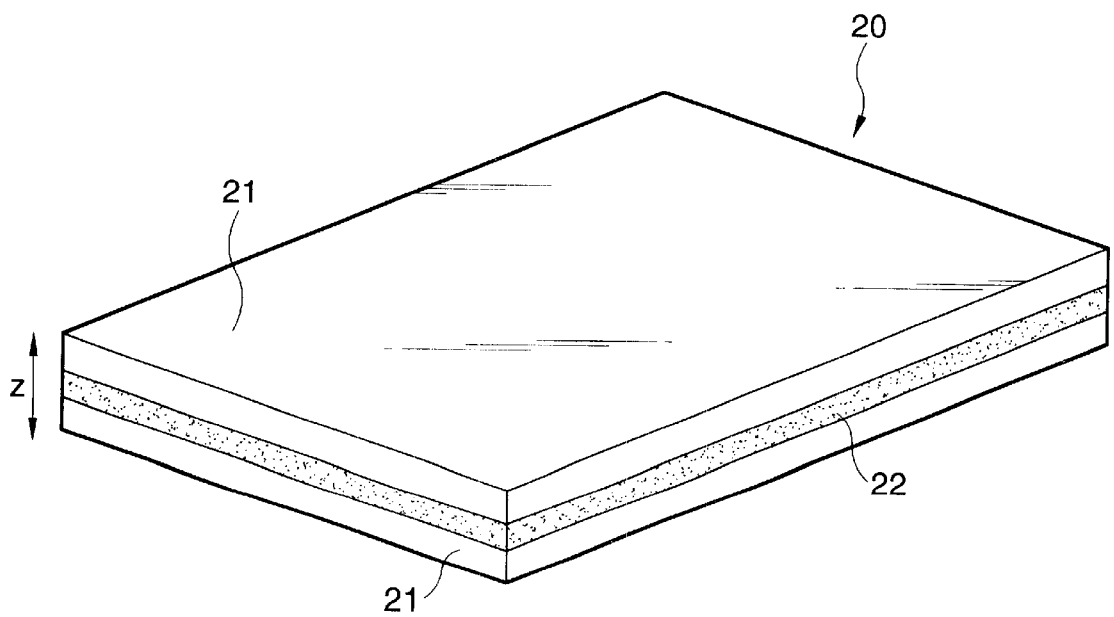
Figure 2A:
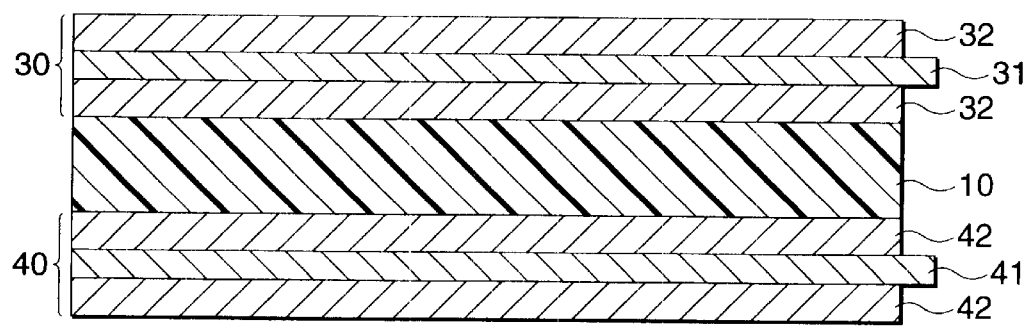
[FIG. 2]
Figure 2B:
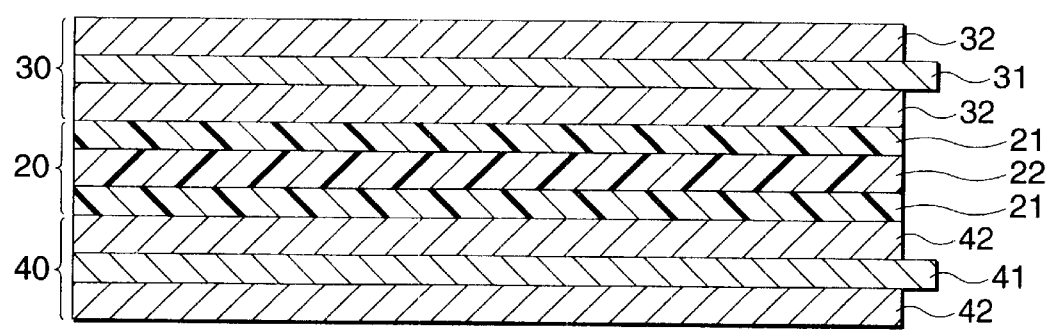
Figure 3:
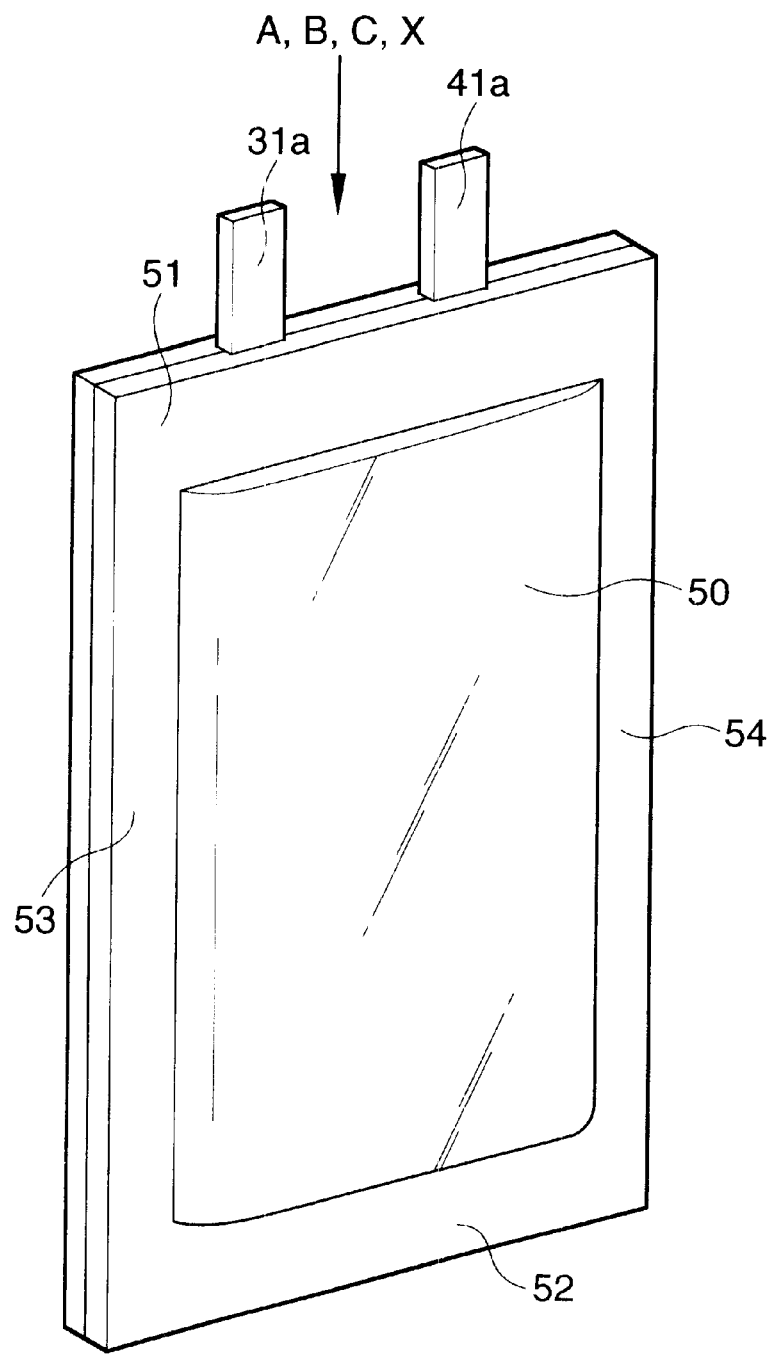
[FIG. 3]

Hereinafter, referring to FIGS. 1 to 3, an explanation will be given of an embodiment of the nonaqueous secondary battery according to the invention. FIG. 1 is a schematic perspective view of a separator according to the invention. FIG. 1(*a*) shows a composite resin film with a reinforcing material layer integrally filled with polyvinylidene fluoride resin. FIG. 1(*b*) shows a composite resin film with a polyvinylidene fluoride resin and a reinforcing material layer stacked thereon. FIG. 2 is a sectional view of a structure in which a positive electrode plate and a negative electrode plate are stacked with these separator intervening therebetween. FIG. 2(*a*) is a sectional view of the laminate using the separator shown in FIG. 1(*a*). FIG. 2(*b*) is a sectional view of the laminate using the separator shown in FIG. 1(*b*). FIG. 3 is a schematic view of a nonaqueous secondary battery formed by wounding these laminates wound and housing them in a laminate case.

1. Preparation of Separator

(1) EXAMPLE 1

Non-woven fabric made of polyethylene terephthalate (PET) 11 having a thickness of 30 μm serving as a reinforcing agent is integrally filled with polyvinylidene fluoride (PVdF) resin 12, thereby preparing a separator of a composite resin film. The separator 10 thus prepared is used as the composite resin film a according to Example 1.

(2) EXAMPLE 2

Non-woven fabric made of polypropylene (PP) 11 having a thickness of 30 μm serving as a reinforcing agent is integrally filled with polyvinylidene fluoride (PVdF) resin 12, thereby preparing a separator of a composite resin film. The separator 10 thus prepared is used as the composite resin film b according to Example 1.

(3) EXAMPLE 3

Polyvinylidene fluoride (PVdF) resin films 21 and 22 are bonded on both surfaces of a microporous film of polyethylene (PE) having a thickness of 30 μm serving as a reinforcing agent. thereby preparing a separator of a composite resin film. The separator 20 thus prepared is used as the composite resin film b according to Example 3.

(4) COMPARATIVE EXAMPLE

Figure 5:
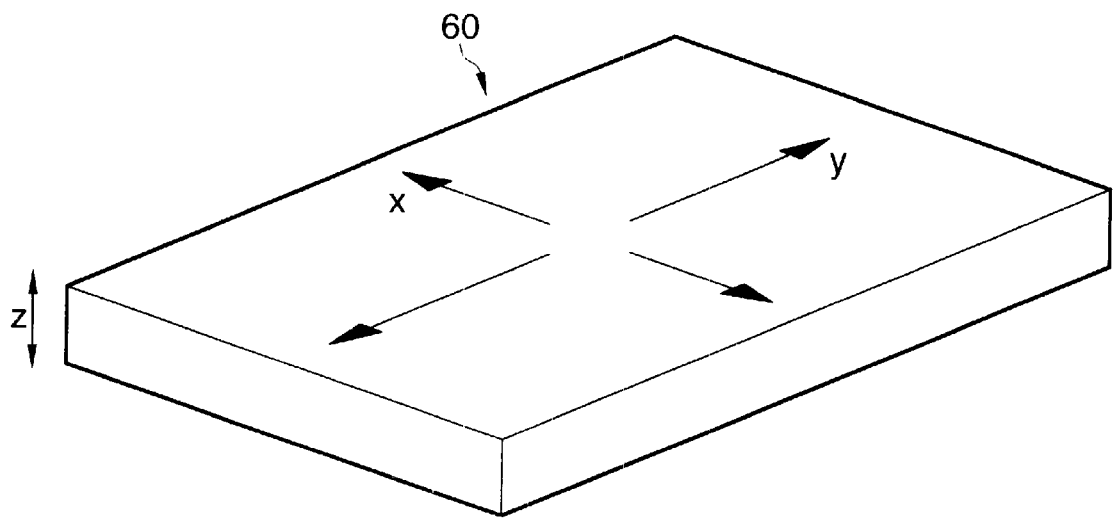
[FIG. 5]
Figure 6:
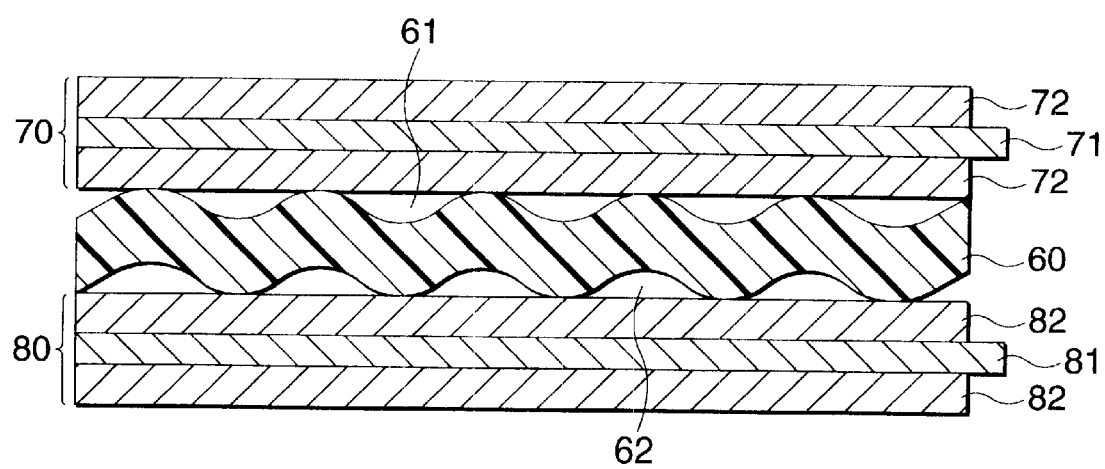
[FIG. 6]

Without using the reinforcing agent, a separator 60 (FIG. 5) made of only a polyvinylidene fluoride (PVdF) film having a thickness of 30 μm is prepared. The separator is used as a resin film x according to Comparative Example.

Polyvinylidene fluoride described above may be vinylidene copolymer of vinylidene fluoride homopolymer or vinylidene fluoride and at least one selected from the group consisting of ethylene trifluoride chloride, ethylene tetrafluride, propylene hexafluoride and ethylene.

2. Preparation of Positive Electrode Plate

A positive electrode active material of lithium-containing cobalt oxide ($LiCoO_2$) heat-treated at a temperature of 700–900° C., graphite and "KETCHEN BLACK" serving as a conducting agent and fluoresin serving as a binding agent are mixed at a mass rate of 90:3:2:5 and dissolved into an organic solvent of N-methyl-2-pyrolidon (NMP), thereby forming a paste 32.

The paste 32 is uniformly applied onto both surfaces of a metallic core body 31 (e.g. aluminum foil having a thickness of 20 μm) by e.g. doctor blade technique. The core body is passed through a heated dryer so that it is heat-treated in vacuum at the temperature of 100–150° C. to remove the organic solvent which was necessary in preparing the paste.

Thereafter, the core body is rolled by a roll-pressing machine to have a thickness of 0.17 mm, thereby preparing a positive electrode plate 30.

3. Preparation of Negative Electrode Plate

On the other hand, a negative electrode active material of natural graphite (d=3.36 Å) and fluorine resin as a binding agent are mixed at a mass rate of 95:5 and dissolved into an organic solvent of N-methyl-2-pyrolidon (NMP), thereby forming a paste 42. The paste 42 is uniformly applied to both surfaces of a metallic core body 41 (e.g. copper foil having a thickness of 20 μm) by e.g. doctor blade technique. The core body is passed through a heated dryer so that it is heat-treated in vacuum at the temperature of 100–150° C. to remove the organic solvent which was necessary in preparing the paste. Thereafter, the core body is rolled by a roll-pressing machine to have a thickness of 0.14 mm, thereby preparing a negative electrode plate 40.

4. Preparation of Nonaqueous Secondary Battery

A positive electrode collecting tab 31*a* is attached to the positive electrode plate 30 thus prepared and a negative electrode collecting tab 41*a* is attached to the negative electrode plate 40 thus prepared. Thereafter, these electrode plates are stacked with the separator 10, 20, 60 made of each resin film a, b, c and x intervening therebetween. The resultant laminate is wound by a take-up machine (not shown). The outermost layer is taped down to form a spiral electrode body. The spiral electrode body is crushed flatly to form a plate-like body.

$LiPF_6$ of 0.05 mol/liter as electrolyte salt and a $LiN(SO_2C_2F_5)_2$ of 0.95 mol/liter are dissolved in a mixed solvent of ethylene carbonate (EC) and diethylcarbonate (DEC) mixed at a volume ratio of 3:7, thus preparing an electrolyte.

The ends of the laminate having a five-layer structure consisting of PET, adhesive, aluminum, adhesive and adhesive of PP are put together, and these pair of ends are thermally sealed to form sealing portions 53 and 54, thereby preparing a cylindrical case body 50.

As shown in FIG. 3, with the positive collecting tab 31*a* and negative collecting tab 41*a* being protruded from the one opening of the case body 50, the plate-like body formed by crushing the spiral electrode body flatly is inserted in the case body. With the positive collecting tab 31*a* and the negative collecting tab 41*a* inserted the one opening portion, it is thermally sealed to form a sealing portion 51.

The electrolyte prepared described above is injected into the other opening of the case body, and the opening is sealed thermally to form a sealing portion 52. In this way, four kinds of nonaqueous secondary batteries A, B, C and X are completed. The capacity of each of the nonaqueous secondary batteries A, B, C and X is 500 mAh.

The nonaqueous secondary battery manufactured using the composite resin film a according to Example 1 is referred to as battery A; the nonaqueous secondary battery manufactured using the composite resin film b according to Example 2 is referred to as battery B; the nonaqueous secondary battery manufactured using the composite resin film c according to Example 3 is referred to as battery C; and the nonaqueous secondary battery manufactured using the composite resin film x according to Comparative Example is referred to as battery X.

5. Measurement of Impedance

Using each of the batteries A, B, C and X thus completed, an AC voltage at a frequency of 1 kHz is applied between the positive and negative terminals of each of the batteries A, B, C and X to measure the impedance (mΩ/cm$^2$) of each of the batteries A, B, C or X. The measurement result is shown in Table 1.

TABLE 1

| Kind of Battery | Kind of Separator | Impedance (mΩ/cm$^2$) |
|---|---|---|
| A | Composite Resin Film a | 0.18 |
| B | Composite Resin Film b | 0.19 |
| C | Composite Resin Film c | 0.20 |
| X | Resin Film x | 0.26 |

As understood from Table 1, the battery A using the composite resin film a (using the non-woven fabric of PET as the reinforcing agent), the battery A using the composite resin film a (using the non-woven fabric of PET as the reinforcing agent), the battery B using the composite resin film b (using the non-woven fabric of PP as the reinforcing agent) and the battery C using the composite resin film c (using the microporous film of PE as the reinforcing agent) have an internal impedance lower than that of the battery X using the resin film x (using only a polyvinylidene fluoride (PVdF) film without using the reinforcing agent).

This is probably attributed to the following facts. Although polyvinylidene fluoride (PVdF) resin film has a good electrolyte-retaining nature, it absorbs the electrolyte to swell in all the directions of width, length and thickness and wrinkle so that gaps are produced between itself and the positive electrode 30 or negative electrode 40, thereby increasing the internal resistance (internal impedance).

On the other hand, where the reinforcing agent of the non-woven fabric of PET or PP is integrally filled with polyvinylidene fluoride (PVdF) resin or the reinforcing agent of the microporous film of PE is stacked on the polyvinylidene fluoride (PVdF) resin, even if the separator swells due to the electrolyte, its swelling is limited by the reinforcing agent in the directions of width and length so that the separator 10 or 20 swells in only the direction of thickness (z-direction in FIG. 1) and does not wrinkle, thereby decreasing the internal resistance (internal impedance).

6. Cycle Test

The nonaqueous secondary batteries A and X prepared in the manner described above are charged at a constant charging current of 50 mA (1C) to reach a battery voltage of 4.1 V, and fully charged for three hours at a constant voltage of 4.1 V. After suspension for ten minutes at room temperature, they are discharged at a discharging current of 500 mA (1C) at room temperature to reach a termination voltage of 2.75 V. In this way, the test of charging/discharging cycle is carried out to acquire the rate (%) of the discharging capacity for each cycle to an initial discharging capacity. The cycle characteristic thus obtained is shown in a graph of FIG. 4.

Figure 4:
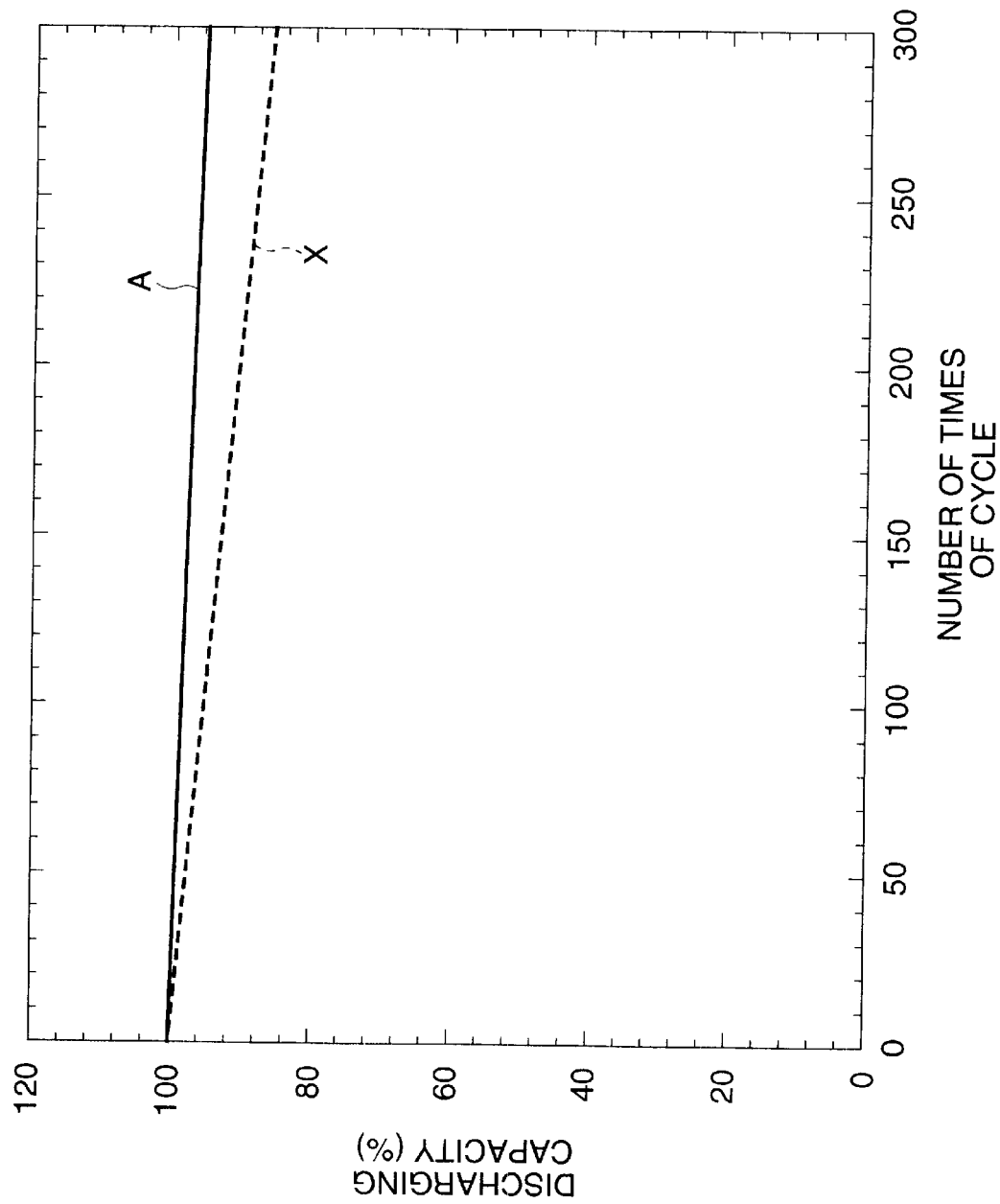
[FIG. 4]

As seen from FIG. 4, the battery A using the composite resin film a (using the non-woven fabric of PET as the reinforcing agent) exhibits a better cycle characteristic than that of the battery X using the resin film x (using only a polyvinylidene fluoride (PVdF) film without using the reinforcing agent). This is probably attributed to the fact that in the battery X, which uses only the polyvinylidene fluoride (PVdF) film as a separator, the separator swells in all the directions of width, length and thickness and wrinkles, thereby increasing the internal resistance to attenuate the cycle characteristic.

7. Continuous Excessive Charging Test

The nonaqueous secondary batteries A, B and X prepared in the manner as described above are continuously charged at a constant current of 500 mA (1C) with an electricity quantity (2000 mAh) four times as large as the battery capacity to acquire the rate (%) of occurrence of abnormally such as internal short-circuiting. The result acquired is shown in Table 2.

TABLE 2

| Kind of Battery | Kind of Separator | Rate of Occurrence (%) | State of Abnormality |
|---|---|---|---|
| A | Composite Resin Film a | 0 | No abnormality |
| B | Composite Resin Film b | 0 | No abnormality |
| X | Resin Film | 100 | Internal Short-circuit |

As seen from Table 2, the battery X using the resin film x (using only a polyvinylidene fluoride (PVdF) film without using the reinforcing agent) generated the abnormality of internal short-circuit, whereas both of the battery A using the composite resin film a (using the non-woven fabric of PET as the reinforcing agent) and the battery B using the composite resin film b (using the non-woven fabric of PP as the reinforcing agent) generated no abnormality.

This is probably attributed to the fact that in the battery X, which uses only the polyvinylidene fluoride (PVdF) resin film as the separator, the separator swells in all the directions of width, length and thickness and wrinkle so that gaps are produced between itself and the positive electrode or negative electrode and dendrite is produced in the gaps, thereby leading to short-circuiting.

As understood from the description hitherto made, in accordance with the invention, the separator 10, 20 is formed of the composite resin film with the reinforcing material layer 11 of the non-woven fabric of PET or PP integrally filled with polyvinylidene fluoride (PVdF) resin or the reinforcing material layer 22 stacked on the polyvinylidene fluoride (PVdF) resin. For this reason, even if the polyvinylidene fluoride (PVdF) resin layer 12 or the polyvinylidene fluoride (PVdF) resin layer 21 retains the electrolyte and swells, its swelling is limited by the reinforcing material layer 11, 22 in the directions of width and length so that the separator 10 or 20 does not wrinkle, thereby decreasing the internal resistance. Thus, a nonaqueous secondary battery with excellent cycle characteristic and excessive charging characteristic can be obtained.

Where the reinforcing material layer 22 is stacked on the polyvinylidene fluoride (PVdF) resin layer 21, if the thickness of the reinforcing material layer 22 is increased, the mechanical strength of the separator 20 is also increased so that even if the polyvinylidene fluoride (PVdF) resin layer 21 swells, the separator does not wrinkle. However, since the internal space of the battery is limited, if the thickness of the reinforcing material layer 22 is increased, the thickness of the polyvinylidene fluoride (PVdF) resin layer must be decreased correspondingly. This leads to attenuation of its electrolyte-retaining nature. For this reason, it is preferred that the thickness of the reinforcing material layer 22 is set at 30 μm or less, preferably 5–30 μm so that even when the polyvinylidene fluoride (PVdF) resin film 21 swells, the separator 20 does not wrinkle.

In the above embodiment described above, the case body was made of the laminate of five-layer structure. However, the case body may be a metallic can made of stainless steel or aluminum.

Further, in the above embodiment described above, natural graphite (d=3.36 Å) was used as the negative electrode active material. However, the negative electrode active material may be a carbon material capable of intercalating/deintercalating lithium ions, e.g. carbon black, cokes, glassy carbon, carbon fiber, or a baked body thereof, or metal oxide (SnO, $SnO_2$) or metallic compound (Li—Al) of lithium capable of intercalating of lithium ions, etc.

Further, in the embodiment described above, $LiCoO_2$ was used as the positive electrode active material. However, the positive electrode active material may be preferably lithium-containing transient metallic compound capable of receiving lithium ions as a guest, e.g. $LiNiO_2$, $LiCoxNi_{(1-x)}O_2$, $LiCrO_2$, $LiVO_2$, $LiFeO_2$, $LiTiO_2$, $LiScO_2$, $LiYO_2$, $LiMn_2O_4$, etc. Particularly, it may be preferably $LiMn_2O_4$, $LiCoO_2$, $LiCoxNi_{(1-x)}$, solely or in combination.

The electrolyte may be an ion conductor with lithium salt dissolved as a solute in an organic solvent which is high in ion conduction, is chemically and electrochemically stable for each of positive and negative electrodes, can be used safely in a wide temperature range, and is inexpensive. For example, instead of the organic solvent described above, propylene carbonate (PC), sulfolane (SL), tetrahydrofuran (THF), γ-butyrolactone (GbL) or their mixed solvent may be preferably used.

A gel solvent containing polymeric compound such as acrylate polymer, urethane acrylate polymer, etc may be used.

The solute may be lithium salt with strong electron attracting nature. Instead of LiPFe or $LiN(SO_2C_2F_5)_2$, for example, $LiBF_4$, $LiClO_4$, $LiAsF_6$, $LiSO_3CF_3$, $LiN(SO_2CF_3)_2$, $LiSO_3C_4F_9$, etc. may be preferably used.

What is claimed is:

1. A nonaqueous secondary battery including a spiral electrode body comprising a negative electrode capable of intercalating and deintercalating lithium ions, a positive electrode having a lithium-containing metal oxide as a positive electrode active material, a nonaqueous electrolyte, and a separator for separating the positive electrode and negative electrode from each other, wherein said separator includes a polyvinylidene fluoride resin and a reinforcing material layer made of a non-woven fabric of polyethylene terephthalate to limit swelling of the polyvinylidene fluoride resin when the resin retains the electrolyte.

2. A nonaqueous secondary battery according to claim 1, wherein said separator is a composite resin film with a polyvinylidene fluoride resin layer and a reinforcing material layer stacked thereon.

3. A nonaqueous secondary battery according to claim 2, wherein said separator is a composite resin film with a polyvinylidene fluoride resin layer and a reinforcing material layer stacked thereon repeatedly.

4. A nonaqueous secondary battery according to claim 2, wherein a thickness of the reinforcing material layer is not more than 30 μm.

5. A nonaqueous secondary battery according to claim 2, wherein a thickness of the reinforcing material layer is not less than 5 μm and not more than 30 μm.

6. A nonaqueous secondary battery according to claim 2, wherein said polyvinylidene fluoride resin is a vinylidene fluoride homopolymer or vinylidene copolymer of vinylidene fluoride and at least one member selected from the group consisting of ethylene trifluoride chloride, ethylene tetrafluride, propylene hexafluoride and ethylene.

7. A nonaqueous secondary battery according to claim 2, wherein said positive electrode contains, as a positive active material, lithium-containing cobalt oxide and said negative electrode contains, as a negative active material, graphite.

8. A nonaqueous secondary battery including a spiral electrode body comprising a negative electrode capable of intercalating and deintercalating lithium ions, a positive electrode having a lithium-containing metal oxide as a positive electrode active material, a nonaqueous electrolyte, and a separator for separating the positive electrode and negative electrode from each other, wherein said separator is a composite resin film with a non-woven fabric made of polyethylene terephthalate as a reinforcing material layer integrally filled with a polyvinylidene fluoride resin, the non-woven fabric reinforcing material layer to limit swelling of the polyvinylidene fluoride resin when the resin retains the electrolyte and wherein said polyvinylidene fluoride resin is a vinylidene fluoride homopolymer or vinylidene copolymer of vinylidene fluoride and at least one member selected from the group consisting of ethylene trifluoride chloride, ethylene tetrafluride, propylene hexafluoride and ethylene.

9. A nonaqueous secondary battery according to claim 8, wherein a thickness of said reinforcing material layer is not more than 30 μm.

10. A nonaqueous secondary battery according to claim 8, wherein a thickness of the reinforcing material layer is not less than 5 μm and not more than 30 μm.

11. A nonaqueous secondary battery according to claim 8, wherein said positive electrode contains, as a positive active material, lithium-containing cobalt oxide and said negative electrode contains, as a negative active material, graphite.

* * * * *